US009349193B2

(12) United States Patent
Chen et al.

(10) Patent No.: US 9,349,193 B2
(45) Date of Patent: May 24, 2016

(54) METHOD AND APPARATUS FOR MOVING OBJECT DETECTION USING PRINCIPAL COMPONENT ANALYSIS BASED RADIAL BASIS FUNCTION NETWORK

(71) Applicant: National Taipei University of Technology, Taipei (TW)

(72) Inventors: Bo-Hao Chen, Taipei (TW); Shih-Chia Huang, Taipei (TW)

(73) Assignee: National Taipei University of Technology, Taipei (TW)

( * ) Notice: Subject to any disclaimer, the term of this patent is extended or adjusted under 35 U.S.C. 154(b) by 234 days.

(21) Appl. No.: 14/231,637

(22) Filed: Mar. 31, 2014

(65) Prior Publication Data
US 2015/0279052 A1 Oct. 1, 2015

(51) Int. Cl.
*G06T 7/00* (2006.01)
*G06T 7/20* (2006.01)
*G06K 9/00* (2006.01)
(Continued)

(52) U.S. Cl.
CPC ............ *G06T 7/208* (2013.01); *G06K 9/00785* (2013.01); *G06K 9/6273* (2013.01); *G06T 7/204* (2013.01); *G06K 2009/3291* (2013.01); *G06T 2207/10016* (2013.01); *G06T 2207/20021* (2013.01); *G06T 2207/20048* (2013.01); *G06T 2207/20076* (2013.01); *G06T 2207/20084* (2013.01); *G06T 2207/20144* (2013.01); *G06T 2207/30236* (2013.01)

(58) Field of Classification Search
USPC ......................................................... 382/103
See application file for complete search history.

(56) References Cited

U.S. PATENT DOCUMENTS

2013/0039534 A1* 2/2013 Shih-Chia ................. G06T 7/20
382/103
2013/0278501 A1* 10/2013 Bulzacki ................. G06F 3/017
345/157

FOREIGN PATENT DOCUMENTS

TW 201403498 1/2014

OTHER PUBLICATIONS

Belhumeur, Peter N, Hespanha, Joao P, Kriegman, David J. "Eigenfaces vs. Fisherfaces: REcognition Using Class Specific Linear Projection" IEEE Transactions of Pattern Analysis and Machine Intelligence vol. 19 No. 7 Jul. 1999.*

(Continued)

*Primary Examiner* — Kim Vu
*Assistant Examiner* — Molly Delaney
(74) *Attorney, Agent, or Firm* — Jianq Chyun IP Office

(57) ABSTRACT

A method for moving object detection based on a Principal Component Analysis-based Radial Basis Function network (PCA-based RBF network) includes the following steps. A sequence of incoming frames of a fixed location delivered over a network are received. A plurality of Eigen-patterns are generated from the sequence of incoming frames based on a Principal Component Analysis (PCA) model. A background model is constructed from the sequence of incoming frames based on a Radial Basis Function (RBF) network model. A current incoming frame is received and divided into a plurality of current incoming blocks. Each of the current incoming blocks is classified as either a background block or a moving object block according to the Eigen-patterns. Whether a current incoming pixel of the moving object blocks among the current incoming blocks is a moving object pixel or a background pixel is determined according to the background model.

18 Claims, 5 Drawing Sheets

(51) Int. Cl.
  *G06K 9/62* (2006.01)
  *G06K 9/32* (2006.01)

(56) References Cited

OTHER PUBLICATIONS

Faruqe, Omar, Hasan, Al Mehedi. "Face Recognition Using PCA and SVM" 3rd International Conference on Anit-counterfeiting, Security, and Identification in Communication, 2009.*

Chen et al., "An Advanced Moving Object Detection Algorithm for Automatic Traffic Monitoring in Real-World Limited Bandwidth Networks", IEEE Transactions on Multimedia, Apr. 2014, pp. 837-847, vol. 16. No. 3.

Zhou et al., "Modified GMM Background Modeling and Optical Flow for Detection of Moving Objects", Systems, Man and Cybernetics, 2005 IEEE International Conference, Oct. 10-12, 2005, pp. 2224-2229, vol. 3.

Elgammal et al., "Background and Foreground Modeling Using Nonparametric Kernel Density Estimation for Visual Surveillance", Proceedings of the IEEE, Jul. 2002, pp. 1151-1163, vol. 90, No. 7.

Manzanera et al., "A New Motion Detection Algorithm Based on $\Sigma$-$\Delta$ Background Estimation", Pattern Recognition Letters, vol. 28, Issue 3, Feb. 2007, pp. 320-328.

Ha et al., "Foreground Objects Detection Using Multiple Difference Images", Optical Engineering, Apr. 2010, pp. 047201-1-pp. 047201-5, vol. 49(4).

Manzanera et al., "A Robust and Computationally Efficient Motion Detection Algorithm Based on $\Sigma$-$\Delta$ Background Estimation," ICVGIP, Allied Publishers Private Limited, Dec. 16-18, 2004, pp. 46-51.

Oral et al., "Centre of Mass Model—A Novel Approach to Background Modelling for segmentation of Moving Objects", Image and Vision Computing, Aug. 1, 2007, pp. 1365-1376.

"Office Action of Taiwan Counterpart Application," issued on Mar. 11, 2016, p. 1-p. 13, in which the listed reference was cited.

* cited by examiner

METHOD AND APPARATUS FOR MOVING OBJECT DETECTION USING PRINCIPAL COMPONENT ANALYSIS BASED RADIAL BASIS FUNCTION NETWORK

INCORPORATION BY REFERENCE

This application is based upon the disclosure of the paper titled *An advanced Moving Object Detection Algorithm for Automatic Traffic Monitoring in Real-World Limited Bandwidth Networks* which will be published in IEEE TRANSACTIONS ON MULTIMEDIA, VOL. 16, NO. 3 in April 2014. The aforementioned paper is incorporated by reference for all purposes.

TECHNICAL FIELD

The present disclosure generally relates to a method and an apparatus for moving object detection using a Principal Component Analysis-based Radial Basis Function network (PCA-based RBF network).

BACKGROUND

In recent years, video image detection systems have been proposed in various applications for identifying and tracking moving objects. In particular, wireless video surveillance which uses automatic detection to track a moving object has been a key technology in the management of intelligent surveillance systems. Within the field of traffic management as an example, video image detection techniques have been deployed in intelligent transportation systems (ITS) for the purposes such as alleviating traffic congestions, advancing transportation safeties, and optimizing traffic flows. By accurately distinguishing vehicles from background objects, an intelligent transportation system may obtain current traffic volumes along a road or even detect and track a particular vehicle.

Conventional moving object detection methods may be classified into three main approaches: Temporal Differencing, Optical Flow, and Background Subtraction.

For a Temporal Differencing related technique, the regions of motion may be detected based on pixel-wise differences between successive frames in a video stream. Such technique could be adaptive to dynamic scene changes, but yet it has a tendency to incompletely extract shapes of moving objects particularly when moving objects are motionless.

An Optical Flow related technique may estimate flow vectors of moving objects based on partial derivatives with respect to temporal and spatial coordinates from brightness values between successive frames in a video stream. However, such technique could be sensitive to noise and inefficient for traffic applications due to computational burdens.

A Background Subtraction related technique has been a commonly used technique in video surveillance and target recognitions. By the background subtraction technique, moving foreground objects would be able to be segmented from stationary or dynamic background scenes by comparing pixel differences between a current image and a reference background model of the previous image. The background subtraction related technique has been the most satisfactory method for motion detection.

Many variations of the background subtraction method have been proposed to detect moving vehicles within video sequences in an ideal bandwidth network environment. An $\Sigma$-$\Delta$ filter technique has been used in the Sigma Difference Estimation (SDE) approach to estimate two orders of temporal statistics for each pixel in a sequence in accordance with a pixel-based decision framework. Unfortunately, the SDE approach may be insufficient for complete object detections in certain complex environments. In an attempt to remedy this problem, the Multiple SDE (MSDE) approach which combines multiple $\Sigma$-$\Delta$ estimators to calculate a hybrid background model has been developed. Besides the $\Sigma$-$\Delta$ filter technique, the Gaussian Mixture Model (GMM) has been widely used for robustly modeling backgrounds. Using the GMM model, each pixel value is modeled independently in one particular distribution, and a subsequent distribution of each pixel would be determined based on whether or not it belongs to the background. On the other hand, a simple background model is derived by the Simple Statistical Difference (SSD) method using the temporal average as the main criteria to accomplish the detection of moving vehicles. The Multiple Temporal difference (MTD) method retains several previous reference frames with which the differences between each frame would be calculated. This, in turn, shrinks gaps within the moving objects.

Unfortunately, video communication over real-world networks with limited bandwidths may frequently suffer from network congestions or bandwidth instabilities. This may be especially problematic when transmitting video information over wireless video communication systems. Therefore, a rate control scheme has been introduced as an effective video-coding tool for controlling the bit rate of video streams. Using this technique, variable bit-rat of video streams are produced to allow superior transmissions in wireless communication systems.

Nonetheless, although the rate-control scheme may increase the efficiency of video stream transmissions over networks with limited bandwidths, its tendency to continuously change bit rates may decrease the ease of detecting moving objects. Hence, the aforementioned state-of-the-art background subtraction methods in variable bit-rate video streams generally may not produce satisfactory detection results.

For example, FIGS. 1(a)-1(c) illustrate a same streaming video captured by a camera and transmitted over a wireless network. FIGS. 1(a) and 1(b) present an illustration of the intensity variations between a background pixel 101 and a background pixel 102. The fluctuations vary from low bit-rate to high bit-rate over a short span of time. In FIG. 1(a), a background model generated by a conventional background subtraction technique may regard a stable background signal of a tree (i.e. the pixel 101) as a background object in a low bit-rate video stream. In this scenario, when the network bandwidth is sufficient, the rate control scheme would typically increase a low bit-rate video stream to a high bit-rate video stream in order to match the available network bandwidth. FIG. 1(b) demonstrates that the aforementioned background subtraction method would easily misjudge a high-quality background signal (i.e. the pixel 102) as a moving object in the high bit-rate video stream.

FIGS. 1(b) and 1(c) present an illustration of the short-term intensity variations from high bit-rate to low bit-rate between a pixel 103 and a pixel 104. In FIG. 1(b), a fluctuant background signal of the tree in the high bit-rate video stream is adapted by the generated background model of the aforementioned background subtraction method. Thus, the background model may regard the fluctuant signal (i.e. the pixel 103) as a background object when sufficient network bandwidth is present. However, when wireless video transmission over real-world networks with limited bandwidth suffers either network congestion or unstable bandwidth, the rate control scheme may be compensated by producing a low bit-rate video stream. This could have a detrimental effect on motion detection, as is illustrated in FIG. 1(c), which shows that the signal of a moving vehicle (i.e. the pixel 104) in the low bit-rate video stream might be misinterpreted as a background object by aforementioned background subtraction method.

In response to the aforementioned problem of misidentification resulted from fluctuating qualities of video stream transmission, a new scheme of moving object detection method is proposed in order to enhance the accuracy of image detection under the circumstance of having variation in bit-rate video streams over real-world networks with limited bandwidth.

SUMMARY

Accordingly, the present disclosure is directed to a method and an apparatus for moving object detection using Principal Component Analysis-based Radial Basis Function network (PCA-based RBF network), and the present disclosure is able to distinguish a moving object in variable bit-rate video streams in an efficient manner.

The present disclosure is directed to a moving object detection method based on a PCA-based RBF network. The method includes the following steps: receiving a sequence of incoming frames of a fixed location delivered over a network; generating a plurality of Eigen-patterns from the sequence of incoming frames based on a PCA model, where the PCA model comprises an optimal projection vector; constructing a background model from the sequence of incoming frames based on a RBF network model, where the RBF network model includes an input layer having a plurality of input layer neurons, a hidden layer having a plurality of hidden layer neurons, and an output layer having an output layer neuron, and where there exists a weight between each of the hidden layer neurons and the output layer neuron; receiving a current incoming frame delivered over the network and partitioning the current incoming frame into a plurality of current incoming blocks; classifying each of the current incoming blocks as either a background block or a moving object block according to the Eigen-patterns; and determining whether a current incoming pixel of the moving object blocks among the current incoming blocks is a moving object pixel or a background pixel according to the background model.

According to an exemplary embodiment of the present disclosure, the step of generating the Eigen-patterns from the sequence of incoming frames based on the PCA model includes: partitioning each of the incoming frames into a plurality of sample blocks and classifying the sample blocks into a plurality of classes; calculating a total scatter matrix according to the sample blocks; calculating the optimal projection vector by maximizing a determinant of the total scatter matrix; and obtaining each of the Eigen-patterns according to the optimal projection vector and the corresponding sample block.

According to an exemplary embodiment of the present disclosure, the formulas for generating the Eigen-patterns from the sequence of incoming frames based on the PCA model include Eq.(1)-Eq.(3):

$$S_T = \sum_{i=1}^{M} (b_i - u)(b_i - u)^T \qquad \text{Eq. (1)}$$

where $S_T$ is the total scatter matrix, $\{b_1, b_2, \ldots, b_M\}$ is a set of the M sample blocks in an k-dimensional block-space, u represents a mean of all the sample blocks, $b_i$ represents the $i^{th}$ sample block of each of the incoming frames and is classified as one of M classes $\{B_1, B_2, \ldots, B_M\}$ and M and k are positive integers, $$W_{opt} = \underset{W}{\arg\max} |W^T S_T W| = [w_1, w_2, \ldots, w_m] \qquad \text{Eq. (2)}$$

where $W_{opt}$ is the optimal projection vector, and $[w_1, w_2, \ldots, w_m]$ represents a set of eigenvectors of $S_T$, m is an empirical dimensionality value of the Eigen-patterns, m is a positive integer, and m<k, and $$E_{ep_i} = W_{opt}^T b_i \qquad \text{Eq.(3)}$$

where $E_{ep_i}$ is the Eigen-pattern corresponding to the $i^{th}$ sample block $b_i$, and $W_{opt}^T$ is the transposition of $W_{opt}$.

According to an exemplary embodiment of the present disclosure, the step of constructing the background model from the sequence of incoming frames based on the RBF network model includes: calculating a difference between an intensity value of each sample pixel of the sequence of incoming frames and a background candidate corresponding to each of hidden layer neurons; determining if the difference exceeds a first threshold value; if yes, updating the corresponding sample pixel as a new background candidate of the corresponding hidden layer neuron; if no, updating the corresponding hidden layer neuron by a learning rate; and updating the weight between each of the hidden layer neurons and the output layer neuron according to the difference by an empirical learning rate.

According to an exemplary embodiment of the present disclosure, the formulas for constructing the background model from the sequence of incoming frames based on the RBF network model include Eq.(4)-Eq.(7):

$$d(p_t(x,y), C(x,y)_j) = \|p_t(x,y) - C(x,y)_j\| \qquad (4)$$

where j=1, ... H, and H indicates the quantity of the hidden layer neurons and is a positive integer greater than 1, $p_t(x,y)$ is the intensity value of the sample pixel at (x,y), $C(x,y)_j$ is the background candidate corresponding to the $j^{th}$ hidden layer neuron, and $d(x,y), C(x,y)_j)$ denotes as an Euclidean distance between $p_t(x,y)$ and $C(x,y)_j$, $$p_i(x, y) \begin{cases} \notin C(x, y)_j & \text{if } d(p_t(x, y), C(x, y)_j) \geq \rho \\ \in C(x, y)_j & \text{otherwise} \end{cases} \qquad (5)$$

where $\rho$ is the first threshold value, $$C'(x,y)_j = C(x,y)_j + \eta_1 \lfloor p_t(x,y) - C(x,y)_j \rfloor \qquad (6)$$

where $\eta_1$ is the learning rate with a non-zero value, $C(x,y)_j$ is the original background candidate corresponding to the $j^{th}$ hidden layer neuron, and $C(x,y)'_j$ is the updated hidden layer neuron corresponding to the $j^{th}$ hidden layer neuron, and $$W'(x,y)_j = W(x,y)_j + \eta_2 \lfloor F - W(x,y)_j \rfloor \cdot d(p_t(x,y), C(x,y)_j) \qquad (7)$$

where $W'(x,y)_j$ is the updated weight between the $j^{th}$ hidden layer neuron and the output neuron, $W(x,y)_j$ is the original weight between the $j^{th}$ hidden layer neuron and the output neuron, $\eta_2$ is the empirical learning rate with a non-zero value, F is an output value of the output neuron at (x,y).

According to an exemplary embodiment of the present disclosure, the step of classifying each of the current incoming blocks as either the background block or the moving object block according to the Eigen-patterns includes: calculating a projection of each of the current incoming blocks according to the optimal projection vector; calculating a similarity level between the Eigen-pattern and the projection of each of the current incoming blocks; determining if the similarity level exceeds a second threshold value; if yes, classifying the current incoming block as the background block; and if no, classifying the current incoming block as the moving object block.

According to an exemplary embodiment of the present disclosure, the formulas for classifying each of the current incoming blocks as either the background block or the moving object block according to the Eigen-patterns include Eq.(8)-Eq.(9):

$$E_{cb_i} = W_{opt}^T b_i \qquad (8)$$

$$b_i \in \begin{cases} \text{background class} & \text{if } \|E_{ep_i} - E_{cb_i}\| > \varepsilon \\ \text{moving object class} & \text{if } \|E_{ep_i} - E_{cb_i}\| \le \varepsilon \end{cases} \qquad (9)$$

where $E_{cb_i}$ is the projection of the current incoming block $b_i$ in the $i^{th}$ class, $E_{ep_i}$ represents the Eigen-pattern in the $i^{th}$ class, and $\varepsilon$ represents the second threshold value.

According to an exemplary embodiment of the present disclosure, the step of determining whether the current incoming pixel of the moving object blocks among the current incoming blocks is the moving object pixel or the background pixel according to the background model includes: designating the current incoming pixel as an input vector to the input layer; propagating the current incoming pixel to the hidden layer neurons and generating a hidden layer output of each of the hidden layer neurons according to a basis function; obtaining an output layer output corresponding to the current incoming pixel according to the hidden layer output and the weight between each of the hidden layer neurons and the output layer neuron; determining if the output layer output is less than a third threshold value; if yes, determining that the current incoming pixel is the moving object pixel; and if no, determining that the current incoming pixel is the background object pixel.

According to an exemplary embodiment of the present disclosure, the formulas for determining whether the current incoming pixel of the moving object blocks among the current incoming blocks is the moving object pixel or the background pixel according to the background model include Eq.(10)-Eq.(13):

$$Z_j(p_t) = \phi(\|p_t - C_j\|), \qquad (10)$$

where $j=1, \ldots H$, and H indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\bullet)$ is the basis function, and $\|p_t - C_j\|$ represents the Euclidean distance between $p_t$ and $C_j$, $$F(p_t) = \sum_{j=1}^{H} W_j \cdot Z_j(p_t) \qquad (11)$$

where $Z_j$ represents the $j^{th}$ hidden layer output, $W_j$ represents a combined weight between the $j^{th}$ hidden layer neuron and the output layer neuron, and $F(p_t)$ represents the output layer output, $$Y(p_t) = \begin{cases} 1, & \text{if } F(p_t) < \Delta \\ 0, & \text{otherwise} \end{cases} \qquad (12)$$

where $\Delta$ is the third threshold value, and $Y(p_t)$ represents the moving object pixel when it is labelled as '1'.

According to an exemplary embodiment of the present disclosure, the basis function is a Hermite function, where the Hermite function is written as Eq.(10.1):

$$\phi(\|p_t - C_j\|) = \frac{1}{\sqrt{\sigma}} \exp\left(\frac{-\|p_t - C_j\|^2}{2\sigma^2}\right) H_n\left(\frac{\|p_t - C_j\|}{\sigma}\right) \qquad (10.1)$$

where $H_n$ is an $n^{th}$-order Hermite function, n is a non-negative integer, and $\sigma$ is an empirical tolerance with a positive value.

The present disclosure is directed to a moving object detection apparatus including a processing unit and a storage unit, where the processing unit is coupled to the storage unit and is configured for: receiving a sequence of incoming frames of a fixed location delivered over a network; generating a plurality of Eigen-patterns from the sequence of incoming frames based on a PCA model, where the PCA model comprises an optimal projection vector; constructing a background model from the sequence of incoming frames based on a RBF network model, where the RBF network model includes an input layer having a plurality of input layer neurons, a hidden layer having a plurality of hidden layer neurons, and an output layer having an output layer neuron, and where there exists a weight between each of the hidden layer neurons and the output layer neuron; receiving a current incoming frame delivered over the network and partitioning the current incoming frame into a plurality of current incoming blocks; classifying each of the current incoming blocks as either a background block or a moving object block according to the Eigen-patterns; and determining whether a current incoming pixel of the moving object blocks among the current incoming blocks is a moving object pixel or a background pixel according to the background model.

According to an exemplary embodiment of the present disclosure, the processing unit is configured for generating the Eigen-patterns from the sequence of incoming frames based on the PCA model including: partitioning each of the incoming frames into a plurality of sample blocks and classifying the sample blocks into a plurality of classes; calculating a total scatter matrix according to the sample blocks; calculating an optimal projection vector by maximizing a determinant of the total scatter matrix; and obtaining each of the Eigen-patterns according to the optimal projection vector and the corresponding sample block.

According to an exemplary embodiment of the present disclosure, the processing unit is configured for generating the Eigen-patterns from the sequence of incoming frames based on the PCA model according to Eq.(1)-Eq.(3):

$$S_T = \sum_{i=1}^{M} (b_i - u)(b_i - u)^T \qquad \text{Eq. (1)}$$

where $S_T$ is the total scatter matrix, $\{b_1, b_2, \ldots, b_M\}$ is a set of the M sample blocks in an k-dimensional block-space, u represents a mean of all the sample blocks, b represents the $i^{th}$ sample block of each of the incoming frames and is classified as one of M classes $\{B_1, B_2, \ldots, B_M\}$, and M and k are positive integers, $$W_{opt} = \arg\max_{W} |W^T S_T W| = [w_1, w_2, \ldots, w_m] \quad \text{Eq. (2)}$$

where $W_{opt}$ is the optimal projection vector, $[w_1, w_2, \ldots, w_m]$ represents a set of eigenvectors of $S_T$, in is an empirical dimensionality value of the Eigen-patterns, m is a positive integer, and m<k, and $$E_{ep_i} = W_{opt}^T b_i \quad \text{Eq.(3)}$$

where $E_{ep_i}$ is the Eigen-pattern corresponding to the $i^{th}$ sample block $b_i$, and $W_{opt}^T$ is the transposition of $W_{opt}$.

According to an exemplary embodiment of the present disclosure, the processing unit is configured for constructing the background model from the sequence of incoming frames based on the RBF network model including: calculating a difference between an intensity value of each sample pixel of the sequence of incoming frames and a background candidate corresponding to each of hidden layer neurons; determining if the difference exceeds a first threshold value; if yes, updating the corresponding sample pixel as a new background candidate of the corresponding hidden layer neuron; if no, updating the corresponding hidden layer neuron by a learning rate; and updating the weight between each of the hidden layer neurons and the output layer neuron according to the difference by an empirical learning rate.

According to an exemplary embodiment of the present disclosure, the processing unit is configured for constructing the background model from the sequence of incoming frames based on the RBF network model according to Eq.(4)-Eq.(7):

$$d(p_t(x,y), C(x,y)_j) = \|p_t(x,y) - C(x,y)_j\| \quad (4)$$

where $j=1, \ldots, H$, and H indicates the quantity of the hidden layer neurons and is a positive integer greater than 1, $p_t(x,y)$ is the intensity value of the sample pixel at (x,y), $C(x,y)_j$ is the background candidate corresponding to the $i^{th}$ hidden layer neuron, and $d(p_t(x,y), C(x,y)_j)$ denotes as an Euclidean distance between $p_t(x,y)$ and $C(x,y)_j$, $$p_t(x,y) \begin{cases} \notin C(x,y)_j & \text{if } d(p_t(x,y), C(x,y)_j) \geq \rho \\ \in C(x,y)_j & \text{otherwise} \end{cases} \quad (5)$$

where $\rho$ is the first threshold value, $$C'(x,y)_j = C(x,y)_j + \eta_1 \lfloor p_t(x,y) - C(x,y)_j \rfloor \quad (6)$$

where $\eta_1$ is the learning rate with a non-zero value, $C(x,y)_j$ is the original background candidate corresponding to the $j^{th}$ hidden layer neuron, and $C(x,y)'_j$ is the updated hidden layer neuron corresponding to the $j^{th}$ hidden layer neuron, and $$W'(x,y)_j = W(x,y)_j + \eta_2 [F - W(x,y)_j \cdot d(p_t(x,y), C(x,y)_j)] \quad (7)$$

where $W'(x,y)$ is the updated weight between the $j^{th}$ hidden layer neuron and the output neuron, $W(x,y)_j$ is the original weight between the $j^{th}$ hidden layer neuron and the output neuron, $\eta_2$ is the empirical learning rate with a non-zero value, F is an output value of the output neuron at (x,y).

According to an exemplary embodiment of the present disclosure, the processing unit is configured for classifying each of the current incoming blocks as either the background block or the moving object block according to the Eigen-patterns including: calculating a projection of each of the current incoming blocks according to the optimal projection vector; calculating a similarity level between the Eigen-pattern and the projection of each of the current incoming blocks; determining if the similarity level exceeds a second threshold value; if yes, classifying the current incoming block as the background block; and if no, classifying the current incoming block as the moving object block.

According to an exemplary embodiment of the present disclosure, the processing unit is configured for classifying each of the current incoming blocks as either the background block or the moving object block according to the Eigen-patterns according to Eq.(8)-Eq.(9):

$$E_{cb_i} = W_{opt}^T b_i \quad (8)$$

$$b_i \in \begin{cases} \text{background class} & \text{if } \|E_{ep_i} - E_{cb_i}\| > \varepsilon \\ \text{moving object class} & \text{if } \|E_{ep_i} - E_{cb_i}\| \leq \varepsilon \end{cases} \quad (9)$$

where $E_{cb_i}$ is the projection of the current incoming block $b_i$ in the ith class, $E_{ep_i}$ represents the Eigen-pattern in the $i^{th}$ class, and $\varepsilon$ represents the second threshold value.

According to an exemplary embodiment of the present disclosure, the processing unit is configured for determining whether the current incoming pixel of the moving object blocks among the current incoming blocks is the moving object pixel or the background pixel according to the background model including: designating the current incoming pixel as an input vector to the input layer; propagating the current incoming pixel to the hidden layer neurons and generating a hidden layer output of each of the hidden layer neurons according to a basis function; obtaining an output layer output corresponding to the current incoming pixel according to the hidden layer output and the weight between each of the hidden layer neurons and the output layer neuron; determining if the output layer output is less than a third threshold value; if yes, determining that the current incoming pixel is the moving object pixel; and if no, determining that the current incoming pixel is the background object pixel.

According to an exemplary embodiment of the present disclosure, the processing unit is configured for determining whether the current incoming pixel of the moving object blocks among the current incoming blocks is the moving object pixel or the background pixel according to the background model according to Eq.(10)-Eq.(13):

$$Z_j(p_t) = \phi(\|p_t - C_j\|), \quad (10)$$

where $j=1, \ldots H$, and H indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\bullet)$ is the basis function, and $\|p_t - C_j\|$ represents the Euclidean distance between $p_t$ and $C_j$, $$F(p_t) = \sum_{j=1}^{H} W_j \cdot Z_j(p_t) \quad (11)$$

where $Z_j$ represents the $j^{th}$ hidden layer output, $W_j$ represents a combined weight between the $j^{th}$ hidden layer neuron and the output layer neuron, and $F(p_t)$ represents the output layer output, $$Y(p_t) = \begin{cases} 1, & \text{if } F(p_t) < \Delta \\ 0, & \text{otherwise} \end{cases} \quad (12)$$

where $\Delta$ is the third threshold value, and $Y(p_t)$ represents the moving object pixel when it is labelled as '1'.

According to an exemplary embodiment of the present disclosure, the basis function is a Hermite function, wherein the Hermite function is written as Eq.(10.1):

$$\phi(\|p_t - C_j\|) = \frac{1}{\sqrt{\sigma}} \exp\left(\frac{-\|p_t - C_j\|^2}{2\sigma^2}\right) H_n\left(\frac{\|p_t - C_j\|}{\sigma}\right) \quad (10.1)$$

where $H_n$ is an $n^{th}$-order Hermite function, n is a non-negative integer, and a is an empirical tolerance with a positive value.

In view of the aforementioned descriptions, the present disclosure is able to attain complete and accurate detection of moving objects in both high and low bit-rate video streams over real-world networks with limited bandwidth which feature realistic situations through a PCA-based RBF network model in an efficient manner.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
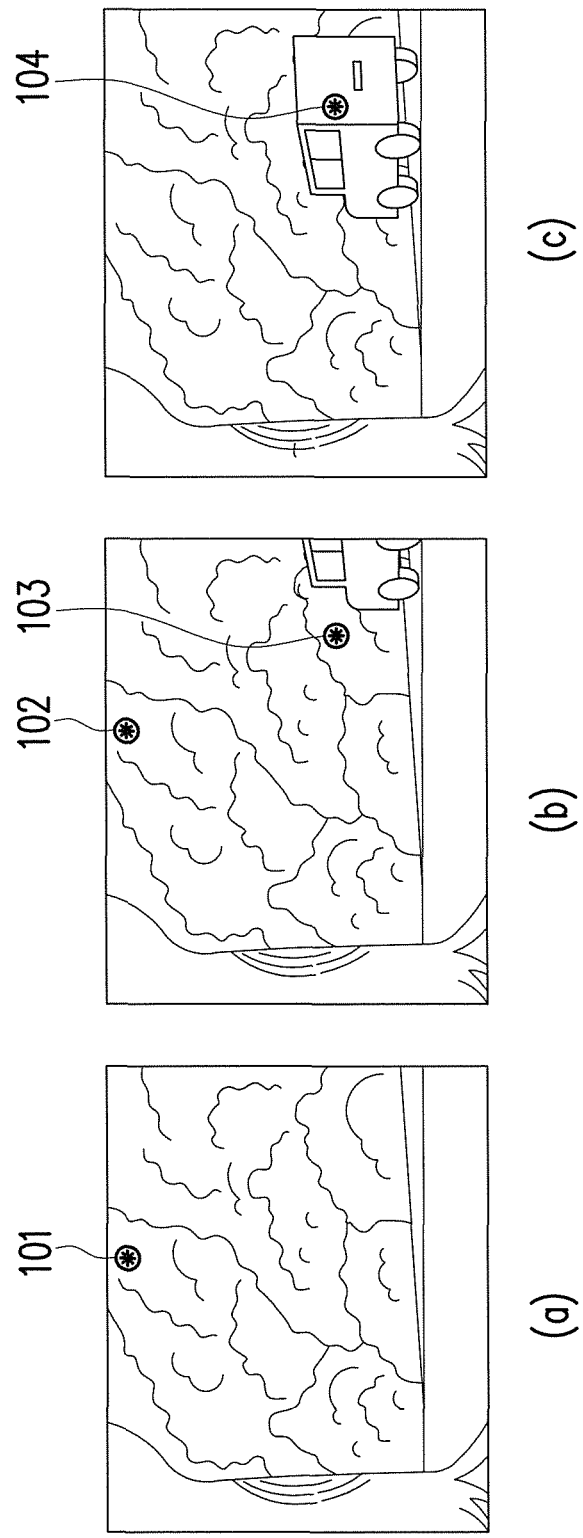
FIGS. 1(a)-1(c) illustrate a same streaming video captured by a camera and transmitted over a wireless network.

Reference will now be made in detail to the present embodiments of the disclosure, examples of which are illustrated in the accompanying drawings. Wherever possible, the same reference numbers are used in the drawings and the description to refer to the same or like parts.

Figure 2:
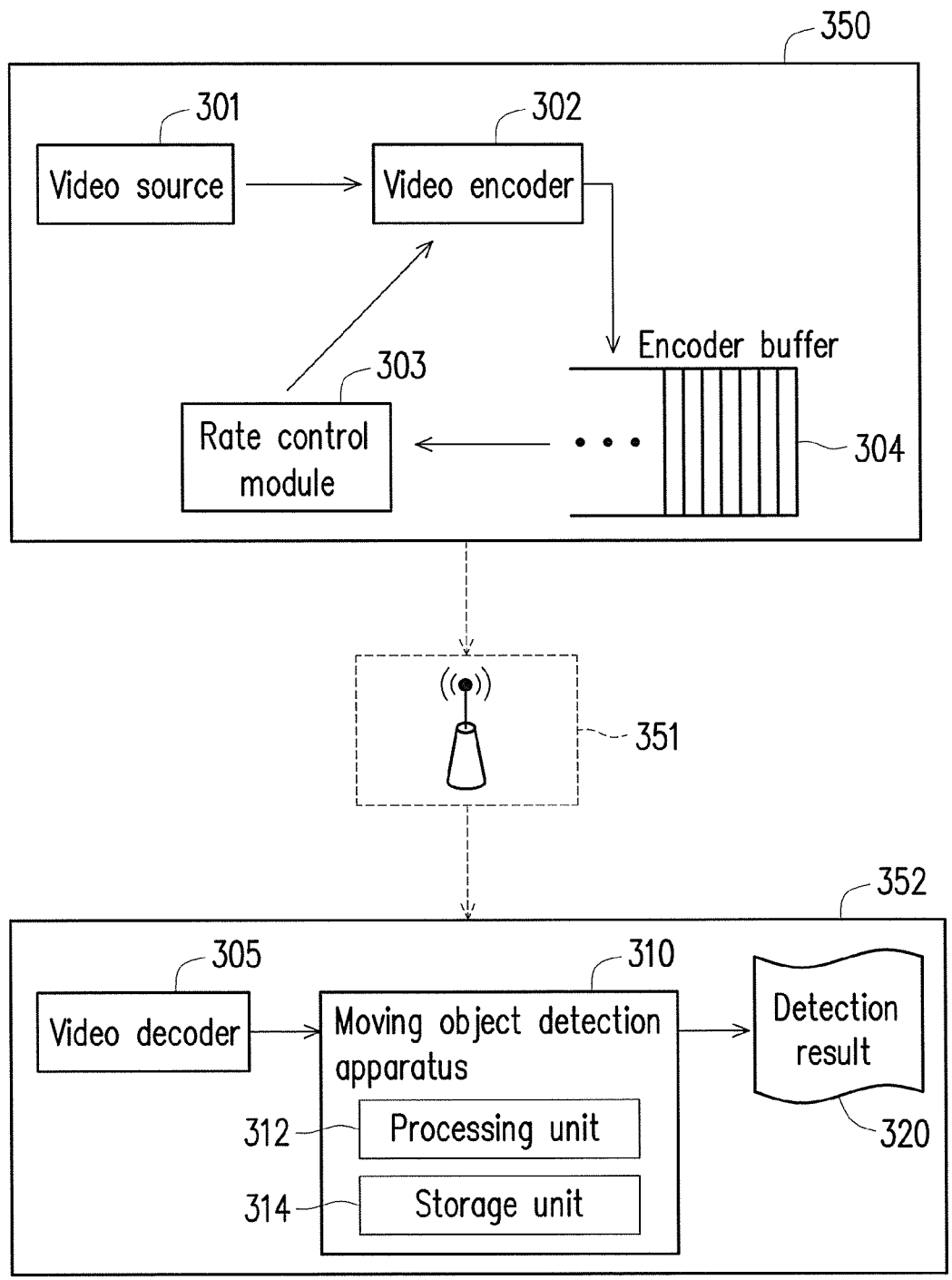
FIG. 2 illustrates an exemplary system architecture which utilizes the proposed method from the hardware perspective in accordance with one of the exemplary embodiments of the present disclosure.

FIG. 2 illustrates an exemplary system architecture which utilizes the proposed moving object detection method from the hardware perspective in accordance with one of the exemplary embodiments of the present disclosure. A typical system for moving object detection could be deployed in a traffic management system to detect traffic volume or a particular vehicle or could be deployed in an airport or shopping center for security purposes. The exemplary system of FIG. 2 may include a recording platform 350 and an analysis platform 352. The recording platform 350 may include a video source 301 which is an apparatus for capturing videos or motion pictures such as one or more surveillance cameras. The video source 301 would output captured raw footage to a video encoder 302 which would typically be controlled by a rate control module 303. The video encoder 302 would output encoded video to an encoder buffer 304 which would interact with the rate control module 303 to control the video encoder 302. The recording platform 350 would then output encoded videos to a network 351 by going through a wireless connection or a cable connection. The network 351 could be a 3G or LTE network connected to a core network, or the network could be an intranet or a private network. The encoded videos would then be received by the analysis platform 352. The analysis platform 352 would include a video decoder 305 which decodes received encoded videos from the network 351 through a transceiver, and the decoded videos would then be transferred to a moving object detection apparatus 310 which would then output analyzed detection result 320.

It should be mentioned that the moving object detection apparatus 310 would typically be performed as a part of the video encoder 302 within the recording platform 350; however the present disclosure would also propose that the moving object detection apparatus 310 be implemented after the video decoder 305. The advantage of doing so is that the moving object detection method could be performed for video of any specifications as opposed to videos having to adhere to a particular type of specification. The moving object detection apparatus 310 could be an electronic device having a processing unit 312 and a storage unit 314. The processing unit 312 may be one or a combination of a central processing unit (CPU), a programmable general- or specific-purpose microprocessor, a digital signal processor (DSP), a programmable controller, application specific integrated circuits (ASIC), a programmable logic device (PLD), or any other similar devices. The storage unit 314 may be one or a combination of a stationary or mobile random access memory (RAM), read-only memory (ROM), flash memory, hard disk, or any other similar devices. The processing unit 312 is coupled to the storage unit 314, where the processing unit 312 would be used to perform the moving object detection method as proposed, and the storage unit 314 would provide a temporary or permanent storage mean for the analysis platform 352.

Figure 3:
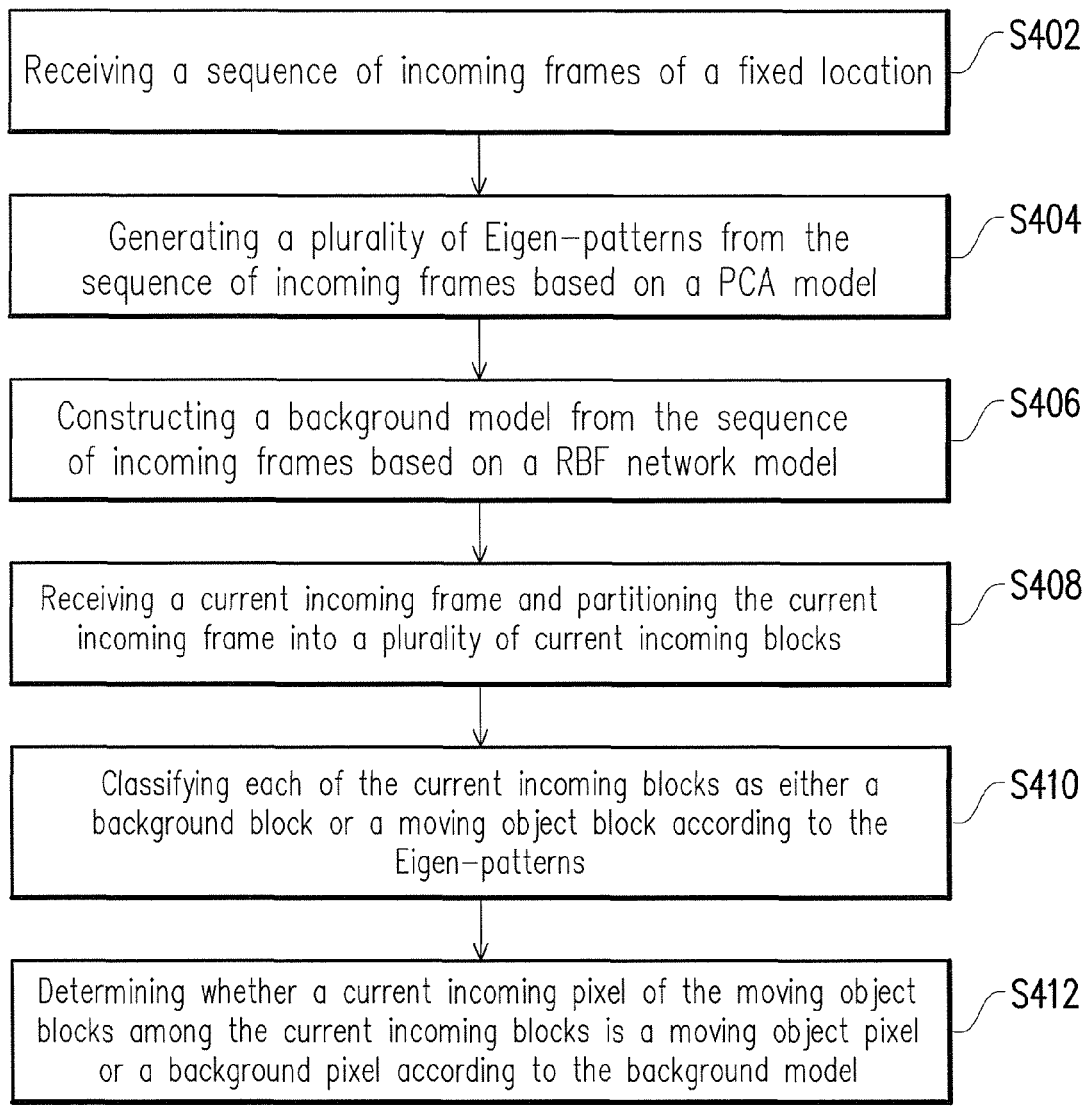
FIG. 3 illustrates a flowchart of a moving objection detection method in accordance with one of the exemplary embodiments of the present disclosure.

FIG. 3 illustrates a flowchart of a moving objection detection method in accordance with one of the exemplary embodiments of the present disclosure. The method proposed in the present embodiment may be performed by the moving object detection apparatus 310 of FIG. 2.

Referring to both FIG. 2 and FIG. 3, the processing unit 312 of the moving object detection apparatus 310 may receive a sequence of incoming frames of a fixed location (Step S402). In other words, an input of an original video frames sequence (i.e. decoded video sequence obtained from the video decoder 305) would be received by the processing unit 312. For any particular spot where images are continuously being captured, the background could be assumed to be fixed.

In the present embodiment, the proposed method is built in $YC_bC_r$ color space via three variables regarding perception with which to provide support for most digital video applications. The three variables are luminance (Y), blue-difference chroma ($C_b$), and red-difference chroma ($C_r$), and the combination of which determines the intensity of each pixel in each of the incoming frames.

To ensure adherence to the properties of variable bit-rate video streams, lower dimensional Eigen-patterns are produced from a time series of each incoming frame through the use of an optimal projection vector by leveraging the Principal Component Analysis (PCA) technique. Hence, the processing unit 312 may generate a plurality of Eigen-patterns from the sequence of incoming frames based on a PCA model (Step S404, referred to as "a discriminative feature extraction process").

To be more specific, the processing unit 312 may first partition each of the incoming frames into N×N blocks, which are regarded as a set of M sample blocks $\{b_1, b_2 \ldots, b_M\}$ in an k-dimensional block-space, where each of the sample blocks is classified as one of M classes $\{B_1, B_2, \ldots, B_M\}$, where N, M and k are positive integers. The optimal projection vector may be dependent upon the maximum determinant of a total scatter matrix of the projected sample blocks. Hence, the processing unit 312 may calculate the total scatter matrix according to Eq.(1):

$$S_T = \sum_{i=1}^{M} (b_i - u)(b_i - u)^T \quad \text{Eq. (1)}$$

where $S_T$ is the total scatter matrix; u represents the mean of all the sample blocks; $b_i$ represents the $i^{th}$ sample block of each of the incoming frames. Note that the sample block size N may be empirically set to 16.

The processing unit 312 may next calculate the optimal projection vector by maximizing the determinant of the total scatter matrix. This may be expressed as Eq.(2):

$$W_{opt} = \arg\max_{W} |W^T S_T W| = [w_1, w_2, \ldots, w_m] \quad \text{Eq. (2)}$$

where $W_{opt}$ is the optimal projection vector; $[w_1, w_2, \ldots, w_m]$ represents a set of eigenvectors of $S_T$. Note that m is the empirical dimensionality value of the Eigen-patterns for dimensionality reduction, and thus m<k.

Consequently, the processing unit 312 may obtain each of the Eigen-patterns according to the optimal projection vector and the corresponding sample block based on Eq.(3):

$$E_{ep_i} = W_{opt}^T b_i \quad \text{Eq.(3)}$$

where $E_{ep_i}$ is the Eigen-pattern corresponding to the $i^{th}$ sample block $b_i$; $W_{opt}^T$ is the transposition of $W_{opt}$.

After the lower-dimensional Eigen-patterns are generated through the discriminative feature extraction process based on the aforementioned PCA model, a reliable background model may be established through an adaptive background model via a Radial Basis Function (RBF) network to memorize the variable bit-radio video stream properties. The information with communicated impulse is then relayed to neurons in the hidden layer of the RBF network. Such combined architecture is referred to as the PCA-based RBF network.

Figure 4:
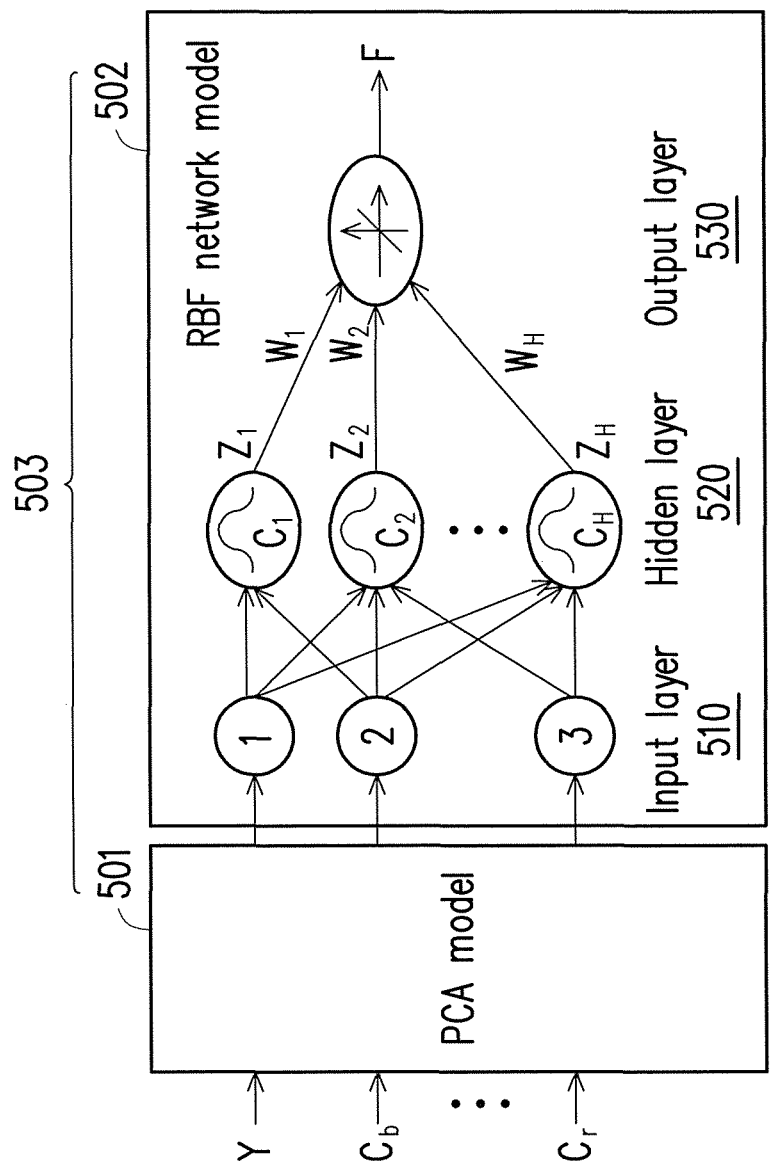
FIG. 4 illustrates a architecture of a PCA-based RDF network in accordance with one of the exemplary embodiments of the present disclosure

To be specific, the processing unit 312 may construct a background model from the sequence of incoming frames based on a RBF network model (Step S406, referred to as "an adaptive background model process"). The architecture of the RBF network model 502 constructed after the PCA model 501 would include an input layer 510, a hidden layer 520, and an output layer 530 as illustrated in FIG. 4, where the combined PCA model 501 and RBF network model 502 are referred to as a PCA-based RBF network model 503. In the present embodiment, the input layer 510 includes three neurons, referred to as input layer neurons. The hidden layer 520 includes H neurons, referred to as hidden layer neurons, where H is a positive integer greater than 1. The output layer 530 includes one neuron, referred to as an output layer neuron. There exists a weight $w_1, w_2, \ldots w_H$ between each of the hidden layer neurons and the output layer neuron.

In order to generate the adaptive background model via the RBF network, the processing unit 312 may first calculate the difference between an intensity value of each sample pixel $p_t(x,y)$ of the sequence of incoming frames and a background candidate corresponding to each of the hidden layer neurons $C(x,y)_1, \ldots C(x,y)_H$. In the present embodiment, the processing unit 312 may calculate the difference based on the Euclidean distance as represented by Eq.(4):

$$d(p_t(x,y), C(x,y)_j) = \|p_t(x,y) - C(x,y)_j\| \quad (4)$$

where j=1, ... H, H is a positive integer greater than 1, $p_t(x,y)$ is the intensity value of the sample pixel at (x,y), $C(x,y)_j$ is the background candidate corresponding to the $j^{th}$ hidden layer neuron, and $d(p_t(x,y), C(x,y)_j)$ denotes as an Euclidean distance between $p_t(x,y)$ and $C(x,y)_j$.

When the processing unit 312 determines that the difference $d(p_t(x,y), C(x,y)_j)$ exceeds a first threshold value ρ, the corresponding sample pixel $p_t(x,y)$ is regarded as a new background candidate of the corresponding hidden layer neuron $C(x,y)_j$. Such decision rule may be represented by Eq.(5):

$$p_t(x, y) \begin{cases} \notin C(x, y)_j & \text{if } d(p_t(x, y), C(x, y)_j) \geq \rho \\ \in C(x, y)_j & \text{otherwise} \end{cases} \quad (5)$$

where ρ may be set to, for example, 20. When the processing unit 312 determines that the difference $d(p_t(x,y), C(x,y)_j)$ does not exceed the first threshold value ρ, the processing unit 312 may update the hidden layer neuron $C(x,y)_j$ by a learning rate. This may be expressed as Eq.(6):

$$C'(x,y)_j = C(x,y)_j + \eta_1 \lfloor p_t(x,y) - C(x,y)_j \rfloor \quad (6)$$

where $C(x,y)_j$ is the original background candidate corresponding to the $j^{th}$ hidden layer neuron; $C(x,y)'_j$ is the updated hidden layer neuron corresponding to the $j^{th}$ hidden layer neuron; is the learning rate with a non-zero value and may be set to, for example, 0.2.

Next, the processing unit 312 may update the weight between each of the hidden layer neurons and the output layer neuron according to the difference by an empirical learning rate as represented by Eq.(7):

$$W'(x,y)_j = W(x,y)_j + \eta_2 \lfloor F - W(x,y)_j \rfloor \cdot d(p_t(x,y), C(x,y)_j) \quad (7)$$

where $W'(x,y)_j$ is the updated weight between the $j^{th}$ hidden layer neuron and the output neuron; $W(x,y)_j$ is the original weight between the $j^{th}$ hidden layer neuron and the output neuron; F is an output value of the output neuron at (x,y); $\eta_2$ is the empirical learning rate with a non-zero value and may be set to, for example, 0.01. Note that all the weights are initialized to '1'. This construction approach of the hidden layer and the updating of weights in the RBF network may be regarded as an unsupervised learning procedure.

The discriminative feature extraction process in Step S404 and the adaptive background model process in Step S406 may be viewed as a various background generation stage, where the properties of variable bit-rate video streams are accommodated effectively by using the PCA-based RBF network. After the various background generation stage is completed, moving objects may be detected accurately in video streams of both low and high bit-rate in a moving object detection stage discussed hereinafter.

Revisiting FIG. 3, moving objects detected by some existing methods during low-to-high bit-rate variation normally exhibit serious artifact generation due to misjudgment of most background signals as belonging to moving objects in high bit-rate environments. To remedy such problem, after the structure of the PCA-based RBF network is established, the processing unit 312 may receive a current incoming frame and partitions the current incoming frame into a plurality of current incoming blocks (Step S408). In the present embodiment, the current incoming frame may be the next frame received after the aforementioned sequence of incoming frames. The $YC_bC_r$ components of each current incoming pixel $p_t$ are delivered to the input of the PCA-based RBF network. The processing unit 312 may divide the current incoming frame into N×N current incoming blocks and compare the similarity of each of the current incoming blocks by using the PCA technique for eliminating unnecessary current incoming blocks, which are indicated as belonging to the background class. Thus, at this point, the processing unit 312 may classify each of the current incoming blocks as either a background block or a moving object block according to the Eigen-patterns (Step S410, referred to as "a feature selection procedure"). Such procedure may be done through comparing the projection of a current incoming block to its corresponding lower-dimensional Eigen-pattern.

To be specific, the processing unit 312 may first calculate the projection of each of the current incoming blocks according to the optimal projection vector based on Eq.(8):

$$E_{cb_i} = W_{opt}^T b_i \qquad (8)$$

where $E_{cb_i}$ is the projection of the current incoming block $b_i$ in the $i^{th}$ class; $E_{ep_i}$ represents the Eigen-pattern in the $i^{th}$ class. Note that the block size N herein may also be empirically set to 16.

Next, the processing unit 312 may calculate a similarity level between the Eigen-pattern and the projection of each of the current incoming blocks for eliminating unnecessary current incoming blocks which are regarded as belonging to background blocks. The processing unit 312 may use Euclidean distance to determine if the similarity level exceeds a second threshold value $\epsilon$. When the processing unit 312 determines that the calculated similarity level of the current incoming block $b_i$ exceeds the second threshold value $\epsilon$, the current incoming block $b_i$ is labeled as belonging to a background class, which means that the current incoming block $b_i$ is classified as a background class and is defined as a background block. When the processing unit 312 determines that the calculated similarity level of the current incoming block $b_i$ does not exceed the second threshold value $\epsilon$, the current incoming block $b_i$ is labeled as belonging to a moving object class, which means that the current incoming block $b_i$ is classified as a moving object class and is defined as a moving object block. Such decision rule my be expressed as Eq.(9):

$$b_i \in \begin{cases} \text{background class} & \text{if } \|E_{ep_i} - E_{cb_i}\| > \epsilon \\ \text{moving object class} & \text{if } \|E_{ep_i} - E_{cb_i}\| \le \epsilon \end{cases} \qquad (9)$$

where $E_{cb_i}$ and $E_{ep_i}$ represent the lower-dimensional Eigen-pattern and the projection of the current incoming block in the $i^{th}$ class respectively, and $\epsilon$ may be set to, for example, 200.

Once the processing unit 312 completes the feature selection procedure, all current incoming blocks classified as belonging the background class (i.e. the background blocks) are eliminated. The processing unit 312 may thus detect moving objects in those current incoming blocks which are known to contain moving objects (i.e. the moving object blocks). Because the properties of variable bit-rate video streams are memorized in the hidden layer of the RBF network, the use of the RBF network during the moving object detection stage can effectively accomplish the detection of moving objects in video streams featuring bit-rates which fluctuate from high to low. As a consequence, the processing unit 312 may determine whether a current incoming pixel of the moving object blocks is a moving object pixel or a background pixel according to the background model (Step S412, referred to as "an object extraction procedure").

To be specific, each pixel of the current incoming blocks, referred to as the current incoming pixel, is designated as the hidden layer neurons an input vector to the input layer and propagated to the hidden layer neurons. In the following discussion, only one current incoming pixel will be presented for simplicity. The processing unit 312 may use the combination of the basis function and the Euclidean distance to generate the output of each hidden layer neuron, referred to as a hidden layer output, based on Eq.(10):

$$Z_j(p_t) = \phi(\|p_t - C_j\|), \qquad (10)$$

where j=1, ... H, H is a positive integer greater than 1, $C_j$ is the $j^{th}$ hidden layer neuron, $p_t$ is the current incoming pixel of the moving object blocks among the current incoming blocks, $\phi(\cdot)$ is the basis function, $\|p_t - C_j\|$ represents the Euclidean distance between $p_t$ and $C_j$. In the present embodiment, the processing unit 312 uses a Hermite function as the basis function for effectively checking the pixel state. This representative function may be written as Eq.(10.1):

$$\phi(\|p_t - C_j\|) = \frac{1}{\sqrt{\sigma}} \exp\left(\frac{-\|p_t - C_j\|^2}{2\sigma^2}\right) H_n\left(\frac{\|p_t - C_j\|}{\sigma}\right) \qquad (10.1)$$

where $H_n$ is an $n^{th}$-order Hermite function, n is a non-negative integer, and $\sigma$ is an empirical tolerance with a positive value. In the present embodiment, n and $\sigma$ may be respectively set to 4 and 6. It should be noted that, the processing unit 312 uses the normalized form of the Hermite polynomials in order to minimize precision errors caused during the computation of factorials in the Hermite function normalization constant.

The output of the output neuron (referred to as an output layer output) may be yielded and may be further separated into a binary motion detection mask. That is, the processing unit 312 may obtain the output layer output corresponding to the current incoming pixel according to the hidden layer output and the weights between each of the hidden layer neurons and the output neuron. In the present embodiment, the processing unit 312 may use a weighted linear combination of the hidden and output layers as Eq.(11):

$$F(p_t) = \sum_{j=1}^{H} W_j \cdot Z_j(p_t) \qquad (11)$$

where $Z_j$ represents the $j^{th}$ hidden layer output; $W_j$ represents a combined weight between the $j^{th}$ hidden layer neuron and the output layer neuron; $F(p_t)$ represents the output layer output.

After the output layer output is computed, the processing unit 312 may determine if the output layer output is less than a third threshold value. If the output layer output is less than the third threshold value, the processing unit 312 may determine that the current incoming pixel is the moving object pixel; otherwise, the processing unit 312 may determine that the current incoming pixel is the background pixel. Such decision rule my be expressed as Eq.(12):

$$Y(p_t) = \begin{cases} 1, & \text{if } F(p_t) < \Delta \\ 0, & \text{otherwise} \end{cases} \qquad (12)$$

where $\Delta$ is the third threshold value, and $Y(p_t)$ represents a motion pixel when it is labelled as '1'.

Figure 5:
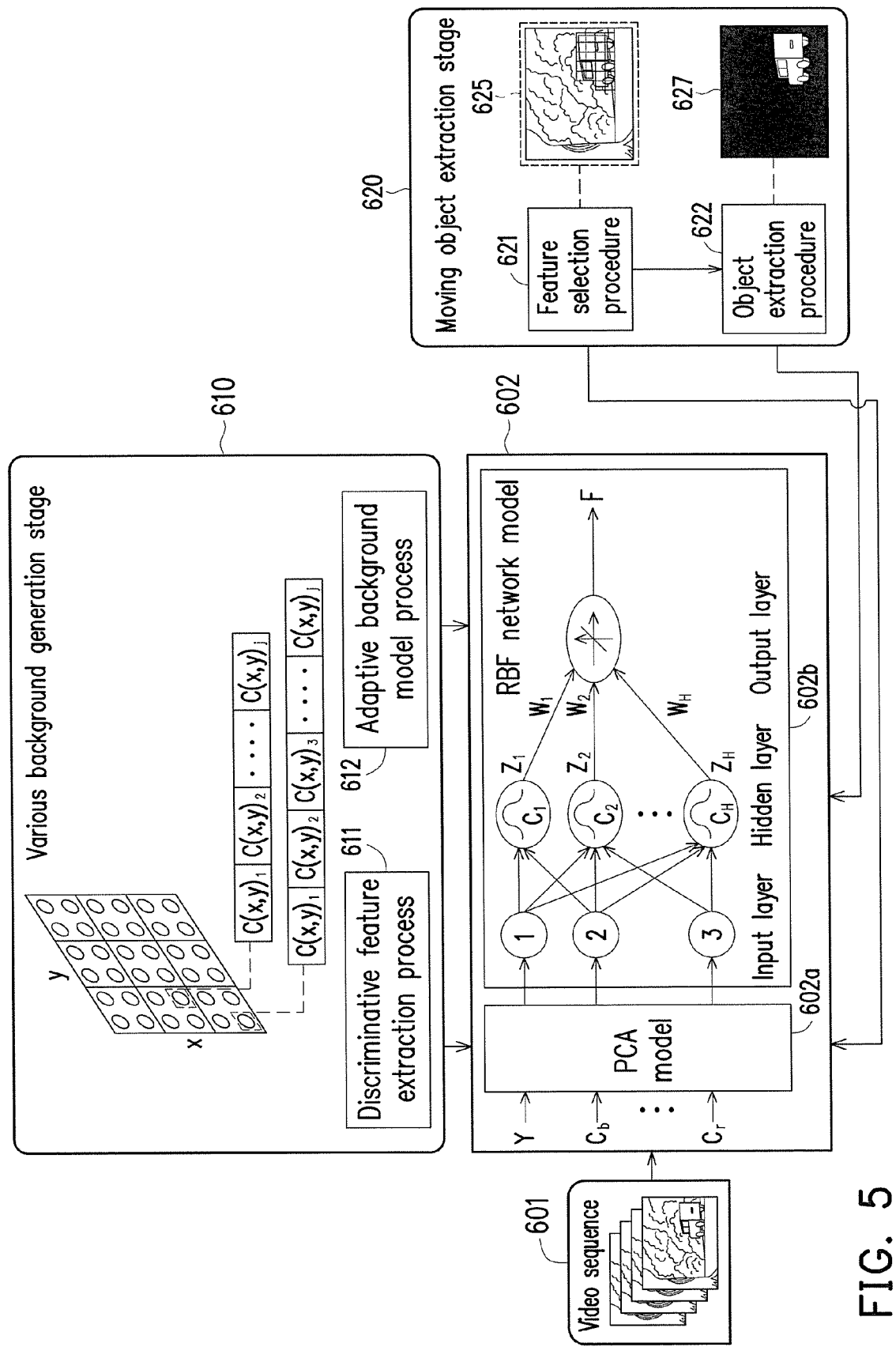
FIG. 5 illustrates a moving object detection method in terms of functional block diagrams in accordance with one of the exemplary embodiments of the present disclosure.

The proposed moving object detection method may be summarized by FIG. 5 in terms of functional block diagrams in accordance with one of the exemplary embodiments of the present disclosure. Referring to FIG. 5, the moving object detection method is arranged in two stages: a various background generation stage 610 and a moving object detection stage 620. The proposed method would take in a video sequence 601. Each incoming frame in the video sequence 601 may be partitioned into equally-sized blocks, whereupon lower-dimensional Eigen-patterns are generated by a discriminative feature extraction process 611 through the use of a PCA model 602a within a lower-dimensional feature space for presenting the properties of variable bit-rate video stream. An adaptive background model process 612 produces an adaptive background model by utilizing a RBF network 602b in order to memorize the properties of variable bit-rate video streams. Subsequently, this information is transmitted as impulse to the hidden layer neurons for creation of the RBF structure.

After a proposed PCA-based RBF network 602 is constructed in the various background generation stage 610, complete and accurate motion detection may be accomplished in a moving object detection stage 620, which consists of a feature selection procedure 621 and an object extraction procedure 622. The feature selection procedure 621 may eliminate unnecessary blocks from equal-sized blocks of incoming frame (i.e. the aforementioned "incoming current blocks") in which the block features are categorized as belonging to the background class and subsequently eliminated through the user of the PCA model 602a in lower-dimensional feature space. Consequently, the background blocks are eliminated through the feature selection procedure 621, and moving objection detection is only engaged for blocks 625 which are regarded as belonging to the moving objects class. This is achieved by using the object extraction procedure 622 via the proposed RBF network 602b and is capable of providing a complete and accurate detection result 627 in variable bit-rate video streams.

In view of the aforementioned descriptions, the present disclosure is able to attain complete and accurate detection of moving objects in both high and low bit-rate video streams over real-world networks with limited bandwidth which feature realistic situations through a PCA-based RBF network model in an efficient manner.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A moving object detection method based on a Principal Component Analysis-based Radial Basis Function network (PCA-based RBF network) comprising:
   receiving a sequence of incoming frames of a fixed location delivered over a network;
   generating a plurality of Eigen-patterns from the sequence of incoming frames based on a Principal Component Analysis (PCA) model, wherein the PCA model comprises an optimal projection vector;
   constructing a background model from the sequence of incoming frames based on a Radial Basis Function (RBF) network model, wherein the RBF network model comprises an input layer having a plurality of input layer neurons, a hidden layer having a plurality of hidden layer neurons, and an output layer having an output layer neuron, and wherein there exists a weight between each of the hidden layer neurons and the output layer neuron;
   receiving a current incoming frame delivered over the network and partitioning the current incoming frame into a plurality of current incoming blocks;
   classifying each of the current incoming blocks as either a background block or a moving object block according to the Eigen-patterns generated from the sequence of incoming frames based on the PCA model comprising:
      calculating a projection of each of the current incoming blocks according to the optimal projection vector;
      calculating a similarity level between the Eigen-pattern and the projection of each of the current incoming blocks;
      determining if the similarity level exceeds a second threshold value;
      if yes, classifying the current incoming block as the background block; and if no, classifying the current incoming block as the moving object block; and determining whether a current incoming pixel of the moving object blocks among the current incoming blocks is a moving object pixel or a background pixel according to the background model.

2. The method of claim 1, wherein the step of generating the Eigen-patterns from the sequence of incoming frames based on the PCA model comprises:

partitioning each of the incoming frames into a plurality of sample blocks and classifying the sample blocks into a plurality of classes;

calculating a total scatter matrix according to the sample blocks;

calculating the optimal projection vector by maximizing a determinant of the total scatter matrix; and obtaining each of the Eigen-patterns according to the optimal projection vector and the corresponding sample block.

3. The method of claim 2, wherein the formulas for generating the Eigen-patterns from the sequence of incoming frames based on the PCA model comprise Eq.(1)-Eq.(3):

$$S_T = \sum_{i=1}^{M} (b_i - u)(b_i - u)^T \qquad \text{Eq. (1)}$$

wherein $S_T$ is the total scatter matrix, $\{b_1, b_2, \ldots, b_M\}$ is a set of the M sample blocks in an k-dimensional block-space, u represents a mean of all the sample blocks, $b_i$ represents the $i^{th}$ sample block of each of the incoming frames and is classified as one of M classes $\{B_1, B_2, \ldots, B_M\}$, and M and k are positive integers, $$W_{opt} = \arg\max_{W} |W^T S_T W| = [w_1, w_2, \ldots, w_m] \qquad \text{Eq. (2)}$$

wherein $W_{opt}$ is the optimal projection vector, and $[w_1, w_2, \ldots, w_n]$ represents a set of eigenvectors of $S_T$ is an empirical dimensionality value of the Eigen-patterns, m is a positive integer, and m<k, and $$E_{ep_i} = W_{opt}^T b_i \qquad \text{Eq.(3)}$$

wherein $E_{ep_i}$ is the Eigen-pattern corresponding to the $i^{th}$ sample block $b_i$, and $W_{opt}^T$ is the transposition of $W_{opt}$.

4. The method of claim 1, wherein the step of constructing the background model from the sequence of incoming frames based on the RBF network model comprises:

calculating a difference between an intensity value of each sample pixel of the sequence of incoming frames and a background candidate corresponding to each of hidden layer neurons;

determining if the difference exceeds a first threshold value;

if yes, updating the corresponding sample pixel as a new background candidate of the corresponding hidden layer neuron;

if no, updating the corresponding hidden layer neuron by a learning rate; and updating the weight between each of the hidden layer neurons and the output layer neuron according to the difference by an empirical learning rate.

5. The method of claim 4, wherein the formulas for constructing the background model from the sequence of incoming frames based on the RBF network model comprise Eq. (4)-Eq.(7):

$$d(p_t(x,y), C(x,y)_j) = \|p_t(x,y) - C(x,y)_j\| \qquad (4)$$

wherein j=1, ... H, and H indicates the quantity of the hidden layer neurons and is a positive integer greater than 1, $p_t(x,y)$ is the intensity value of the sample pixel at (x,y), $C(x,y)_j$ is the background candidate corresponding to the $j^{th}$ hidden layer neuron, and $d(p_t(x,y),C(x,y)_j)$ denotes as an Euclidean distance between $p_t(x,y)$ and $C(x,y)_j$, $$p_t(x, y) \begin{cases} \notin C(x, y)_j & \text{if } d(p_t(x, y), C(x, y)_j) \geq \rho \\ \in C(x, y)_j & \text{otherwise} \end{cases} \qquad (5)$$

wherein $\rho$ is the first threshold value, $$C'(x,y)_j = C(x,y)_j + \eta_1 \lfloor p_t(x,y) - C(x,y)_j \rfloor \qquad (6)$$

wherein $\eta_1$ is the learning rate with a non-zero value, $C(x,y)_j$ is the original background candidate corresponding to the $j^{th}$ hidden layer neuron, and $C(x,y)'_j$ is the updated hidden layer neuron corresponding to the $j^{th}$ hidden layer neuron, and $$W'(x,y)_j = W(x,y)_j + \eta_2 \lfloor F - W(x,y)_j \rfloor \cdot d(p_t(x,y), C(x,y)_j) \qquad (7)$$

wherein $W'(x,y)_j$ is the updated weight between the $j^{th}$ hidden layer neuron and the output neuron, $W(x,y)_j$ is the original weight between the $j^{th}$ hidden layer neuron and the output neuron, $\eta_2$ is the empirical learning rate with a non-zero value, F is an output value of the output neuron at (x,y).

6. The method of claim 3, wherein the formulas for classifying each of the current incoming blocks as either the background block or the moving object block according to the Eigen-patterns comprise Eq.(8)-Eq.(9):

$$E_{cb_i} = W_{opt}^T b_i \qquad (8)$$

$$b_i \in \begin{cases} \text{background class} & \text{if } \|E_{ep_i} - E_{cb_i}\| > \varepsilon \\ \text{moving object class} & \text{if } \|E_{ep_i} - E_{cb_i}\| \leq \varepsilon \end{cases} \qquad (9)$$

wherein $E_{cb_i}$ is the projection of the current incoming block $b_i$ in the $i^{th}$ class, $E_{ep_i}$ represents the Eigen-pattern in the $i^{th}$ class, and $\varepsilon$ represents the second threshold value.

7. The method of claim 4, wherein the step of determining whether the current incoming pixel of the moving object blocks among the current incoming blocks is the moving object pixel or the background pixel according to the background model comprises:

designating the current incoming pixel as an input vector to the input layer;

propagating the current incoming pixel to the hidden layer neurons and generating a hidden layer output of each of the hidden layer neurons according to a basis function;

obtaining an output layer output corresponding to the current incoming pixel according to the hidden layer output and the weight between each of the hidden layer neurons and the output layer neuron;

determining if the output layer output is less than a third threshold value;

if yes, determining that the current incoming pixel is the moving object pixel; and if no, determining that the current incoming pixel is the background object pixel.

8. The method of claim 3, wherein the formulas for determining whether the current incoming pixel of the moving object blocks among the current incoming blocks is the moving object pixel or the background pixel according to the background model comprise Eq.(10)-Eq.(13):

$$Z_j(p_t) = \phi(\|p_t - C_j\|), \quad (10)$$

wherein j=1, ... H, and H indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\cdot)$ is the basis function, and $\|p_t - C_j\|$ represents the Euclidean distance between $p_t$ and $C_j$, $$F(p_t) = \sum_{j=1}^{H} W_j \cdot Z_j(p_t) \quad (11)$$

wherein $Z_j$ represents the $j^{th}$ hidden layer output, $W_j$ represents a combined weight between the $j^{th}$ hidden layer neuron and the output layer neuron, and $F(p_t)$ represents the output layer output, $$Y(p_t) = \begin{cases} 1, & \text{if } F(p_t) < \Delta \\ 0, & \text{otherwise} \end{cases} \quad (12)$$

wherein $\Delta$ is the third threshold value, and $Y(p_t)$ represents the moving object pixel when it is labelled as '1'.

9. The method of claim 8, wherein the basis function is a Hermite function, wherein the Hennite function is written as Eq.(10.1):

$$\phi(\|p_t - C_j\|) = \frac{1}{\sqrt{\sigma}} \exp\left(\frac{-\|p_t - C_j\|^2}{2\sigma^2}\right) H_n\left(\frac{\|p_t - C_j\|}{\sigma}\right) \quad (10.1)$$

wherein $H_n$ is an $n^{th}$-order Hermite function, n is a non-negative integer, and $\sigma$ is an empirical tolerance with a positive value.

10. A moving object detection apparatus, comprising a processor and a memory, wherein the processor is coupled to the memory and is configured for:
receiving a sequence of incoming frames of a fixed location delivered over a network;
generating a plurality of Eigen-patterns from the sequence of incoming frames based on a Principal Component Analysis (PCA) model, wherein the PCA model comprises an optimal projection vector;
constructing a background model from the sequence of incoming frames based on a Radial Basis Function (RBF) network model, wherein the RBF network model comprises an input layer having a plurality of input layer neurons, a hidden layer having a plurality of hidden layer neurons, and an output layer having an output layer neuron, and wherein there exists a weight between each of the hidden layer neurons and the output layer neuron;
receiving a current incoming frame delivered over the network and partitioning the current incoming frame into a plurality of current incoming blocks;
classifying each of the current incoming blocks as either a background block or a moving object block according to the Eigen-patterns generated from the sequence of incoming frames based on the PCA model comprising:
calculating a projection of each of the current incoming blocks according to the optimal projection vector;
calculating a similarity level between the Eigen-pattern and the projection of each of the current incoming blocks;
determining if the similarity level exceeds a second threshold value;
if yes, classifying the current incoming block as the background block; and
if no, classifying the current incoming block as the moving object block; and
determining whether a current incoming pixel of the moving object blocks among the current incoming blocks is a moving object pixel or a background pixel according to the background model.

11. The apparatus of claim 10, wherein the processor is configured for generating the Eigen-patterns from the sequence of incoming frames based on the PCA model comprising:
partitioning each of the incoming frames into a plurality of sample blocks and classifying the sample blocks into a plurality of classes;
calculating a total scatter matrix according to the sample blocks;
calculating the optimal projection vector by maximizing a determinant of the total scatter matrix; and
obtaining each of the Eigen-patterns according to the optimal projection vector and the corresponding sample block.

12. The apparatus of claim 11, wherein the processor is configured for generating the Eigen-patterns from the sequence of incoming frames based on the PCA model according to Eq.(1)-Eq.(3):

$$S_T = \sum_{i=1}^{M} (b_i - u)(b_i - u)^T \quad \text{Eq. (1)}$$

wherein $S_T$ is the total scatter matrix, $\{b_1, b_2, \ldots, b_M\}$ is a set of the M sample blocks in an k-dimensional block-space, u represents a mean of all the sample blocks, and $b_i$ represents the $i^{th}$ sample block of each of the incoming frames and is classified as one of M classes $\{B_1, B_2, \ldots, B_M\}$ and M and k are positive integers, $$W_{opt} = \underset{W}{\operatorname{argmax}} |W^T S_T W| = [w_1, w_2, \ldots, w_m] \quad \text{Eq. (2)}$$

wherein $W_{opt}$ is the optimal projection vector, $[w_1, w_2, \ldots, w_m]$ represents a set of eigenvectors of $S_T$, m is an empirical dimensionality value of the Eigen-patterns, m is a positive integer, and m<k, $$E_{ep_i} = W_{opt}^T b_i \quad \text{Eq.(3)}$$

wherein $E_{ep_i}$ is the Eigen-pattern corresponding to the $i^{th}$ sample block $b_i$, and $W_{opt}^T$ is the transportation of $W_{opt}$.

13. The apparatus of claim 10, wherein the processor is configured for constructing the background model from the sequence of incoming frames based on the RBF network model comprising:
calculating a difference between an intensity value of each sample pixel of the sequence of incoming frames and a background candidate corresponding to each of hidden layer neurons;

determining if the difference exceeds a first threshold value;

if yes, updating the corresponding sample pixel as a new background candidate of the corresponding hidden layer neuron;

if no, updating the corresponding hidden layer neuron by a learning rate; and updating the weight between each of the hidden layer neurons and the output layer neuron according to the difference by an empirical learning rate.

14. The apparatus of claim 13, wherein the processor is configured for constructing the background model from the sequence of incoming frames based on the RBF network model according to Eq.(4)-Eq.(7):

$$d(p_t(x,y),C(x,y)_j)=\|p_t(x,y)-C(x,y)_j\| \quad (4)$$

wherein $j=1,\ldots H$, and H indicates the quantity of the hidden layer neurons and is a positive integer greater than 1, $p_t(x,y)$ is the intensity value of the sample pixel at $(x,y)$, $C(x,y)_j$ is the background candidate corresponding to the $j^{th}$ hidden layer neuron, and $d(p_t(x,y),C(x,y)_j)$ denotes as an Euclidean distance between $p_t(x,y)$ and $C(x,y)_j$, $$p_t(x,y) \begin{cases} \notin C(x,y)_j & \text{if } d(p_t(x,y),C(x,y)_j) \geq \rho \\ \in C(x,y)_j & \text{otherwise} \end{cases} \quad (5)$$

wherein $\rho$ is the first threshold value, $$C'(x,y)_j=C(x,y)_j+\eta_1\lfloor p_t(x,y)-C(x,y)_j\rfloor \quad (6)$$

wherein $\eta_1$ is the learning rate with a non-zero value, $C(x,y)_j$ is the original background candidate corresponding to the $j^{th}$ hidden layer neuron, and $C(x,y)'_j$ is the updated hidden layer neuron corresponding to the $j^{th}$ hidden layer neuron, and $$W'(x,y)_j=W(x,y)_j+\eta_2\lfloor F-W(x,y)_j\rfloor \cdot d(p_t(x,y),C(x,y)_j) \quad (7)$$

wherein $W'(x,y)_j$ is the updated weight between the $j^{th}$ hidden layer neuron and the output neuron, $W(x,y)_j$ is the original weight between the $j^{th}$ hidden layer neuron and the output neuron, $\eta_2$ is the empirical learning rate with a non-zero value, F is an output value of the output neuron at $(x,y)$.

15. The apparatus of claim 12, wherein the processor is configured for classifying each of the current incoming blocks as either the background block or the moving object block according to the Eigen-patterns according to Eq.(8)-Eq.(9):

$$E_{cb_i}=W_{opt}^T b_i \quad (8)$$

$$b_i \in \begin{cases} \text{background class} & \text{if } \|E_{ep_i}-E_{cb_i}\|>\varepsilon \\ \text{moving object class} & \text{if } \|E_{ep_i}-E_{cb_i}\|\leq\varepsilon \end{cases} \quad (9)$$

wherein $E_{cb_i}$ is the projection of the current incoming block $b_i$ in the $i^{th}$ class, $E_{ep_i}$ represents the Eigen-pattern in the $i^{th}$ class, and $\varepsilon$ represents the second threshold value.

16. The apparatus of claim 13, wherein the processor is configured for determining whether the current incoming pixel of the moving object blocks among the current incoming blocks is the moving object pixel or the background pixel according to the background model comprising:

designating the current incoming pixel as an input vector to the input layer;

propagating the current incoming pixel to the hidden layer neurons and generating a hidden layer output of each of the hidden layer neurons according to a basis function;

obtaining an output layer output corresponding to the current incoming pixel according to the hidden layer output and the weight between each of the hidden layer neurons and the output layer neuron;

determining if the output layer output is less than a third threshold value;

if yes, determining that the current incoming pixel is the moving object pixel; and if no, determining that the current incoming pixel is the background object pixel.

17. The apparatus of claim 12, wherein the processor is configured for determining whether the current incoming pixel of the moving object blocks among the current incoming blocks is the moving object pixel or the background pixel according to the background model according to Eq.(10)-Eq.(13):

$$Z_j(p_t)=\phi(\|p_t-C_j\|), \quad (10)$$

wherein $j=1,\ldots H$, and H indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\bullet)$ is the basis function, and $\|p_t-C_j\|$ represents the Euclidean distance between $p_t$ and $C_j$, $$F(p_t)=\sum_{j=1}^{H} W_j \cdot Z_j(p_t) \quad (11)$$

wherein $Z_j$ represents the $j^{th}$ hidden layer output, $W_j$ represents a combined weight between the $j^{th}$ hidden layer neuron and the output layer neuron, and $F(p_t)$ represents the output layer output, $$Y(p_t)=\begin{cases} 1, & \text{if } F(p_t)<\Delta \\ 0, & \text{otherwise} \end{cases} \quad (12)$$

wherein $\Delta$ is the third threshold value, and $Y(p_t)$ represents the moving object pixel when it is labelled as '1'.

18. The apparatus of claim 17, wherein the basis function is a Hermite function, wherein the Hermite function is written as Eq.(10.1):

$$\phi(\|p_t-C_j\|)=\frac{1}{\sqrt{\sigma}}\exp\left(\frac{-\|p_t-C_j\|^2}{2\sigma^2}\right)H_n\left(\frac{\|p_t-C_j\|}{\sigma}\right) \quad (10.1)$$

wherein $H_n$ is an $n^{th}$-order Hermite function, n is a non-negative integer, and $\sigma$ is an empirical tolerance with a positive value.

\* \* \* \* \*